United States Patent [19]
Sugiura et al.

[11] Patent Number: 6,054,401
[45] Date of Patent: *Apr. 25, 2000

[54] FIREPROOF SHEET GLASS

[75] Inventors: Kiminari Sugiura, Ichihara; Akihiro Koyama, Nishinomiya; Tetsuro Yoshii, Toyonaka, all of Japan

[73] Assignee: Nippon Sheet Glass Co., Ltd., Osaka, Japan

[*] Notice: This patent is subject to a terminal disclaimer.

[21] Appl. No.: 09/117,281

[22] PCT Filed: Nov. 17, 1997

[86] PCT No.: PCT/JP97/04180

§ 371 Date: Jul. 20, 1998

§ 102(e) Date: Jul. 20, 1998

[87] PCT Pub. No.: WO98/22403

PCT Pub. Date: May 28, 1998

[30] Foreign Application Priority Data

Nov. 21, 1996 [JP] Japan ................................. 8-310450

[51] Int. Cl.[7] .................................................. C03C 8/087
[52] U.S. Cl. ................................................. 501/70; 501/72
[58] Field of Search ......................................... 501/70, 72

[56] References Cited

U.S. PATENT DOCUMENTS

| | | | |
|---|---|---|---|
| 5,631,195 | 5/1997 | Yanagisawa et al. | 501/70 |
| 5,656,558 | 8/1997 | Brix et al. | 501/70 |
| 5,763,343 | 6/1998 | Brix et al. | 501/70 |
| 5,776,844 | 7/1998 | Koch et al. | 501/70 |
| 5,925,583 | 7/1999 | Yoshii et al. | 501/70 |

FOREIGN PATENT DOCUMENTS

| | | |
|---|---|---|
| 4333792 | 11/1992 | Japan . |
| 5170482 | 7/1993 | Japan . |
| 5193985 | 8/1993 | Japan . |
| 769669 | 3/1995 | Japan . |
| 7172863 | 7/1995 | Japan . |
| 8104539 | 4/1996 | Japan . |

*Primary Examiner*—Karl Group
*Attorney, Agent, or Firm*—Fulbright & Jaworski, LLP

[57] ABSTRACT

The present invention relates to a fireproof sheet glass formed of glass composition which should be classified as a soda-lime glass. Thus far, there has been a demand for a fireproof sheet glass made of soda-lime glass which provides high productivity of sheet glass and which hardly reduces the life of glass melting furnace. However, there has existed none made of soda-lime glass which has high durability and hardly softens. Then, by preparing soda-lime glass in a predetermined glass composition and by using it to obtain a softening point of 780° C. or higher, there has been provided a fireproof sheet glass made of soda-lime glass which provides high durability and which hardly softens.

18 Claims, 1 Drawing Sheet

FIREPROOF SHEET GLASS

BACKGROUND AND SUMMARY OF THE INVENTION

The present invention relates to a fireproof sheet glass, and more particularly to a fireproof sheet glass formed of glass composition which should be classified as a soda-lime glass.

Conventionally, no fireproof sheet glass of the above-noted type is known which achieves a high fireproof performance in the event of a fire. According to some conventional practices, an ordinary soda-lime glass composition would be formed into a wire glass to be utilized as a fireproof sheet glass, or a heat-tempered glass would be made from a soda-lime glass composition to be utilized as a fireproof sheet glass. Incidentally, although it is conceivable to form a fireproof sheet glass from one having a high melting point, such as borosilicate glass, such glass results in low productivity of the sheet glass due to its high melting point, high viscosity and so on. Further, if the glass contains boron, this will tend to reduce the life of the glass melting furnace. Therefore, there has been a demand for providing a fireproof sheet glass using soda-lime glass and there have been conducted intensive researches in this respect.

Incidentally, although the conventional fireproof sheet glass noted above achieves good fireproof performance at an earlier stage of fire, none are known to exist which can satisfy the requirement of A class fire door (according to a fireproof test based on Notice by Japanese Ministry of Construction Serial No. 1125). For instance, the fireproof sheet glass described above does not break when exposed to a fire, thus preventing spread of the fire. However, after lapse of a predetermined period of time, there is observed a phenomenon that the glass itself softens and will escape from e.g. a sheet-glass holding member (sash, frame). Thus, it cannot maintain its shape for 60 minutes according one requirement of the above standard.

Accordingly, an object of the present invention is to provide a fireproof sheet glass which uses soda-lime glass, yet which can satisfy the standard of A glass fire door.

The present inventors discovered that when a sheet glass is heated in accordance with the A class fire door standard, it can reach 770° C.–780° C. by the 60 minutes of heating and further that a sheet glass formed of a glass composition having a melting point of 780° C. or higher has greater possibility of conforming to the above standard.

Then, the present inventors employed, as a fireproof sheet glass, a following glass composition (wt.%) having superior fire resistance previously developed by the present inventors and newly found out that this can suitably satisfy the above standard. Namely;

| | |
|---|---|
| $SiO_2$ | 56~68% |
| $Al_2O_3$ | 0.2~5% |
| $ZrO_2$ | 0~3% |
| $Li_2O$ | 0~0.5% |
| $Na_2O$ | 0.2~4% |
| $K_2O$ | 6~14% |
| MgO | 1~14% |
| CaO | 6~12% |
| SrO | 0~12% |
| BaO | 0~13% |
| ZnO | 0~2%; |
| and; | |
| $Na_2O + K_2O$ | 8~14% |
| MgO + CaO | 8~15% |
| SrO + BaO | 8~14% |
| MgO + CaO + SrO + BaO | 20~27% |
| $SO_3 + Sb_2O_3$ | 0~1% |
| and; | | the composition has an average thermal expansion ratio at 50~350° C. of $75~95\times10^{-7}$/K;

the composition has a warping point of 540° C. or higher; and the composition has a $10^2$ poise temperature of 1560° C. or lower.

Then, for accomplishing the above-noted object, a fireproof sheet glass, according to the characterizing features of the present invention, comprises a composition, in the unit of wt. % of

| | |
|---|---|
| $SiO_2$ | 56~68% |
| $Al_2O_3$ | 0.2~5% |
| $ZrO_2$ | 0~3% |
| $Li_2O$ | 0~0.5% |
| $Na_2O$ | 0.2~4% |
| $K_2O$ | 6~14% |
| MgO | 1~14% |
| CaO | 6~12% |
| SrO | 0~12% |
| BaO | 0~13% |
| ZnO | 0~2%; |
| where, | |
| $Na_2O + K_2O$ | 8~14% |
| MgO + CaO | 8~15% |
| SrO + BaO | 8~14% |
| MgO + CaO + SrO + BaO | 20~27% |
| $SO_3 + Sb_2O_3$ | 0~1% |
| and; | | the composition has an average thermal expansion ratio at 50~350° C. of $75~95\times10^{-7}$/K;

the composition has a warping point of 540° C. or higher;

the composition has a $10^2$ poise temperature of 1560° C. or lower; and the composition has a softening point of 780° C. or higher.

Incidentally, in the composition as above, preferred ranges are conceivable for the respective components thereof. Specifically, it is preferred that the melting point of the glass ($10^2$ poise temperature) be below 1560° C. More preferably, the respective components of the composition should be adjusted to render the melting point 1550° C. or lower. Similarly, regarding the viscosity of the glass composition, it is preferred that an appropriate viscosity be obtained at an inlet opening to a float bath in case the sheet glass is formed by the float process for example. As a condition for this, it is preferred that the respective components be adjusted so as to obtain $10^4$ poise temperature (working temperature) of 1140° C. or lower. It is also preferred that the average thermal expansion at 50~350° C. range at $75~95\times10^{-7}$/K, more preferably at $80~90\times10^{-7}$/K. Further, as it is desired to set the devitrifying temperature so as not to cause devitrification during forming of the glass, it is preferred that the respective components be adjusted so as to obtain a devitrifying temperature of 1140° C. or lower. For these purposes, the contents of the respective components should preferably adjusted as follows.

If the content of $SiO_2$, which is the network former of the glass, is below 56 wt. %, this will result in lowering of the warping point of the glass. Hence, it is preferred that this be present at 58 wt. % or more. Conversely, if the content of $SiO_2$ exceeds 58 wt. %, this will result in reduction in the thermal expansion ratio of the glass and also to difficulty in its tempering when this glass is heat-tempered for use in fire prevention.

$Al_2O_3$ is a component effective for elevating the warping point of the glass. This is also effective, even in a small amount of addition, for improving devitrification and water-resistance properties of the glass. $Al_2O_3$ can provide only a limited effect if present below 0.2 wt. %. Hence, at least 0.2 wt. % or more thereof is needed. And, using it at 0.5 wt. % or more is preferred for significantly improving the devitrification and water-resistant properties. In general, in a portion of inner lining of a melting furnace, alumina type bricks are employed. After having melted glass for a long period of time, the bricks will erode, leading to increase in the concentration of alumina adjacent the bricks. Especially, the glass composition to which the present invention pertains contains large amounts of alkaline metal oxides and alkaline earth metal oxides, so that the erosion of bricks tend to be promoted. In case glass contains a large amount of $Al_2O_3$, the concentration of $Al_2O_3$ increases with development of brick erosion. As a result, there occurs devitrification due to the $Al_2O_3$ component, thus deteriorating the quality of the glass. For this reason, $Al_2O_3$ should be present at 5 wt. % or less, more preferably at 4 wt. % or less.

$Al_2O_3$, $Zro_2$ also is a component effective for elevating the warping point of the glass. However, as $ZrO_2$ affects the physical properties of the glass as is the case with $Al_2O_3$, it is not an essential component in the present invention. Notwithstanding the above, since it is effective, in a small addition amount, for improving the water-resistance of the glass, it is preferred that $ZrO_2$ be used at 0.2 wt. % or more, more preferably at 0.3 wt. % or more.

Generally, alumina type bricks and zirconia type bricks are employed in the inner lining of the melting furnace. Thus, if the furnace has melted glass containing a large amount of $ZrO_2$ for an extended period of time, just like $Al_2O_3$, there will occur devitrification due to $ZrO_2$, leading to deterioration of the quality of the glass. For this reason, it is preferred that $ZrO_2$ be present at 3 wt. % or less, more preferably at 2.5 wt. % or less.

MgO is effective not only for improving the solubility, but also for elevating the warping point. MgO provides only an insufficient effect below 1 wt. % and it is preferred that MgO be present at 2 wt. % or more. However, if the amount of MgO exceeds 7 wt. %, devitrification will likely occur. So that, preferably, the content of MgO should be 6 wt. % or less.

Like MgO, CaO is effective not only for improving the solubility, but also for elevating the warping point. CaO provides only an insufficient effect below 6 wt. % and it is preferred that CaO be present at 7 wt. % or more. However, if the amount of CaO exceeds 12 wt. %, devitrification will likely occur. So that, preferably, the content of CaO should be 10 wt. % or less.

The combined amount of MgO and CaO is 8 wt. % or more in order to improve the solubility and to elevate the warping point. Thus, it is preferred that the combined content of MgO and CaO is 9 wt. % or more. However, if the content exceeds 15 wt. %, devitrification will likely occur. So that, preferably, the content should be 13 wt. % or less.

SrO is not essential but may be effective for improving the solubility and also for raising the warping point. Thus, it is preferred that SrO be present at 2 wt. % or more. However, if the content exceeds 12 wt. %, this will result in increase in the specific weight and also raw material cost. Therefore, it is more preferred that SrO be present at 10 wt. % or less.

BaO, though not essential, is effective for improving the solubility. Thus, it is preferred that BaO be present at 2 wt. % or more However, if this is present at 13 wt. % or more, this will result in increase in the specific weight and also raw material cost. Therefore, it is more preferred that it be present at 10 wt. % or less.

BaO+SrO is needed for further improving the solubility which otherwise would be insufficient only by MgO+CaO and needed also for increasing the expansion coefficient together with $Na_2O+K_2O$. If below 8 wt. %, the effect will be insufficient. Hence, the content should preferably be 10 wt. % or more. Conversely, if the content exceeds 14 wt. %, this will tend to invite devitrification as well as increase in the raw material cost.

A combination of MgO, CaO, Sro, and BaO.

This is effective for improving the solubility of the glass. If the total content is below 20 wt. %, the desired melting temperature cannot be obtained. Hence, it should preferably be 21 wt. % or more. Conversely, if the content exceeds 27 wt. %, this will elevate the devitrifying temperature of glass excessively, presenting difficulty in the plate forming operation. Thus, the content should preferably be 26 wt. % or less.

ZnO is effective for improving solubility, but it tends to easily evaporate to reduce the life of melting furnace. Therefore, the content should preferably be 2 wt. % or less, more preferably 1 wt. % or less.

This component lowers the melting point, but it lowers the warping point to a greater degree. Hence, the content should preferably below 0.5 wt. %, or more preferably substantially zero or below 0.2 wt. %.

This component is effective for improving the solubility and also for increasing the thermal expansion ratio. Further, $Na_2O$ in cooperation with $K_2O$, is effective also for improving the water resistance. Its effect will be insufficient below 0.2 wt. %. Hence, it should preferably be present at 0.5 wt. % or more. However, even with a small addition amount, the component can significantly lower the warping point and also promote the erosion of bricks. Therefore, the content should be limited at 4 wt. % or less, preferably 3.5 wt. % or less, more preferably 3 wt. % or less or even more preferably 2 wt. % or less.

$K_2O$ is a component effective for increasing the thermal expansion ratio and also for elevating the warping point. The effects will be insufficient below 6 wt. %. Hence, the content should preferably be 7 wt. % or more, more preferably 9.5 wt. % or more. However, if the content exceeds 14 wt. %, this will tend to invite devitrification as well as deterioration in the water-resistance. Therefore, it is preferred that the content be 11 wt. % or less.

A combination of $N_2O$ and $K_2O$ is essential for improving the solubility, particularly for increasing the thermal expansion ratio. If the total content is below 8 wt. %, this will result in excessively small thermal expansion ratio. Hence, the content should preferably be 9 wt. % or more, more preferably 10 wt. % or more. On the other hand, if the content exceeds 14 wt. %, this will lower the warping point or elevate the devitrifying temperature. Hence, it is preferred that the content be 13 wt. % or less.

Though not an essential component, $TiO_2$, if present, may be effective for improving the chemical durability. A content of 3 wt. % or more is undesirable, as it will result in coloring of the glass.

For the reasons set forth above, according to the more preferred characterizing features of the present invention, the composition of the fireproof sheet glass for achieving the object are, in the unit of wt. %:

| | |
|---|---|
| $SiO_2$ | from 56% to about 68% |
| $Al_2O_3$ | from 0.2% to about 4% |
| $ZrO_2$ | from 0% to about 2.5% |
| $Li_2O$ | from 0% to about 0.5% |
| $Na_2O$ | from 0.2% to about 3.5% |
| $K_2O$ | from 7% to about 11% |
| MgO | from 2% to about 6% |
| CaO | from 6% to about 10% |
| SrO | from 2% to about 10% |
| BaO | from 2% to about 10% |
| ZnO and; | from 0% to about 2% |
| $Na_2O + K_2O$ | from 8% to about 14% |
| MgO + CaO | from 8% to about 15% |
| SrO + BaO | from 8% to about 14% |
| MgO + CaO + SrO + BaO | from 20% to about 27% |
| $SO_3 + Sb_2O_3$ | from 0% to about 1% | the composition has an average thermal expansion ratio at 50~350° C. of $75$~$95 \times 10^{-7}$/K;

the composition has a warping point of 550° C. or higher;

the composition has a $10^2$ poise temperature of 1550° C. or lower; and the composition has a softening point of 780° C. or higher.

Even more preferably, in the unit of wt. %;

| | |
|---|---|
| $SiO_2$ | 58~66% |
| $Al_2O_3$ | 0.5~4% |
| $ZrO_2$ | 0.2~2.5% |
| $Li_2O$ | 0~0.1% |
| $Na_2O$ | 0.5~3% |
| $K_2O$ | 8~11% |
| MgO | 2~6% |
| CaO | 6~10% |
| SrO | 2~10% |
| BaO | 2~10% |
| ZnO and; | 0~1%; |
| $Na_2O + K_2O$ | 9~13% |
| MgO + CaO | 9~13% |
| SrO + BaO | 10~14% |
| MgO + CaO + SrO + BaO | 21~26% |
| $SO_3 + Sb_2O_3$ and; | 0~1% | the composition has an average thermal expansion ratio at 50~350° C. of $80$~$90 \times 10^{-7}$/K;

the composition has a warping point of 550° C. or higher;

the composition has a $10^2$ poise temperature of 1550° C. or lower; and the composition has a softening point of 780° C. or higher.

With the above-described compositions, the fireproof sheet glass described above provides high heat resistance and also a high softening point of 780° C. or higher. Hence, this glass, when subjected to the fireproof test according to the A class fire door, the glass can effectively endure without being broken. Further, after lapse of the predetermined time period, there hardly occurs such phenomenon of the glass per se being softened and escaping from the sheet-glass holding member (sash, frame) or the like.

Further, according to a further feature of the invention, when the glass is formed as a sheet glass, this may be a wire sheet glass or subjected to a heat-tempering treatment.

If the fireproof glass is provided as a wire glass, the fireproof performance may be further improved and the fireproof performance may be improved by the heat-tempering treatment as well.

Moreover, in the case of a melting operation at a melting temperature of 1560° C. or lower and a working temperature of 1140° C. or lower using bricks containing alumina, the glass will less likely devitrify in the vicinity of these bricks. Further, since the glass is formed of the glass composition having the property of its working temperature being higher than the devitrifying temperature, continuous production of quality glass by the float process is possible, so that the advantage of high productivity may be attained.

BEST MODE OF EMBODYING THE INVENTION

Figure 1:
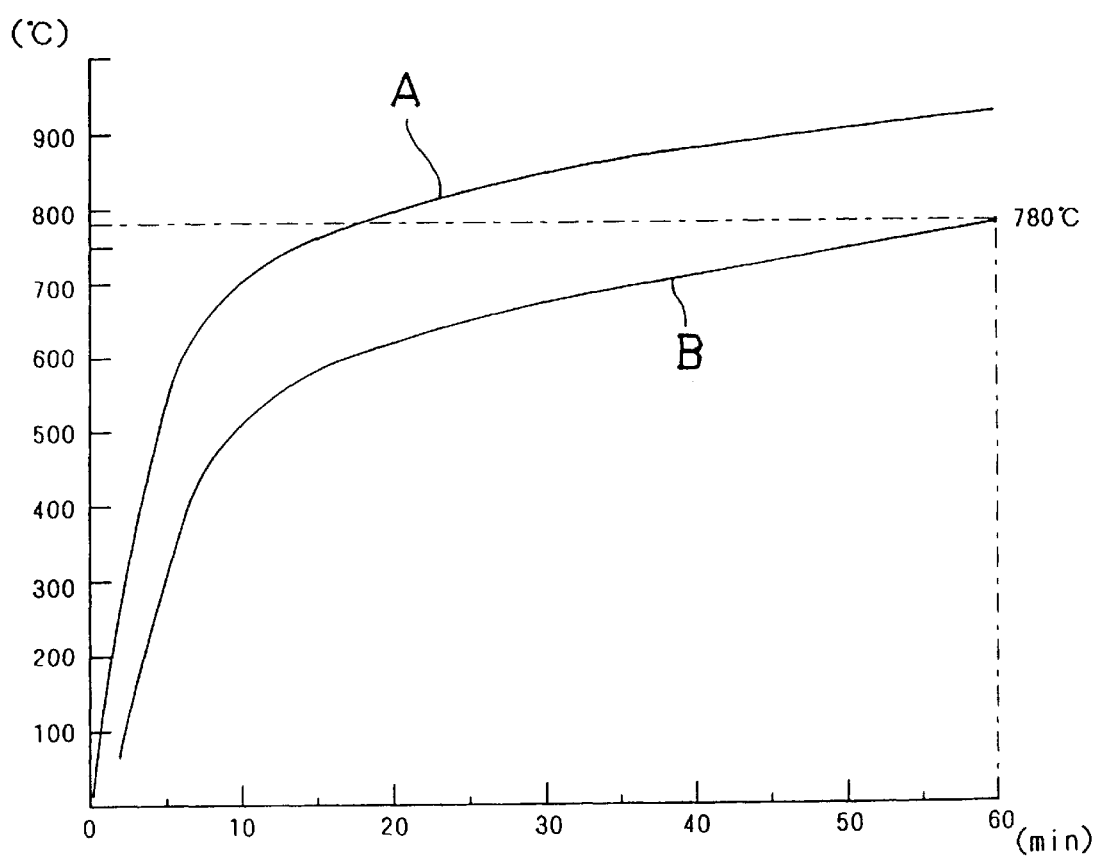
FIG. 1 is a graph illustrating variation of temperature in a sheet glass in a heating test.

Next, embodiments of the present invention will be described in details with reference to the accompanying drawings.

A glass composition of Sample 1 identified in Table 1 was prepared and a sheet glass was formed from this glass composition. Then, the heating test for the A class fire door was conducted on this sheet glass. As the result, the surface temperature varied as illustrated in FIG. 1. The results show that although the surface temperature of the glass reached about 780° C. after one hour of heating, it did not reach the softening point and no deformation of the sheet glass or resultant escaping thereof from the frame did not occur and the glass effectively endured the test, thus proving to be effective for prevention of spreading of fire. Incidentally, in FIG. 1, the vertical axis represents the heating temperature (°C.) and the horizontal as represents the heating time (minutes). And, in the same figure, a mark A denotea the heating temperature and a mark B denotes the temperature of the sheet glass.

EXAMPLE 1

The respective raw materials were prepared so as to obtain the target glass compositions (Samples 1 through 8) identified in Table 1. In this, Glauber's salt was employed as a clarifying agent. Each batch prepared in the manner above was charged into a melting pot and melted at 1500° C. for 4 hours. Then, the melted batch was removed and cooled gradually. On the glass sample thus obtained, measurements were conducted for obtaining its melting point ($10^2$ poise temperature), working temperature ($10^4$ poise temperature), devitrifying temperature, softening point, warping point, thermal expansion ratio, water-resistance, devitrification property adjacent the bricks.

The melting temperature and the working temperature were measured in the manners described below.

The glass was introduced into a 70 cc platinum melting pot and melted at 1550° C., whereby the sample was obtained. Then, this sample was set in a sample-pull-down type high-temperature viscometer, with a platinum ball being suspended within the melted sample glass. Then, viscous resistance applied to the platinum ball when the sample was pulled down together with the container was measured as a load. In this manner, viscosity values at the respective temperatures were obtained. And, the correlation between the temperature and the viscosity was determined over the temperature range of 900–1500° C.

The devitrifying temperature was obtained in the following manner.

The glass was crushed into particles. Then, of these particles, 25 g of them was weighed and obtained which passed a 2830 μm sifter and was then collected on a 1000 μm sifter. These glass particles were spread over a platinum boat having a width of 12 mm, a length of 200 mm and a depth of 9 mm. Then, this was kept for 2 hours within a furnace whose temperature was set so as to obtain an appropriate temperature gradient along the length of the boat. After the boat was withdrawn from the furnace, it was cooled naturally. Then, the glass on the platinum boat was observed with a microscope. And, the highest temperature where devitrification had developed was determined as the devitrifying temperature.

The softening point was measured in the following manner.

First, there was prepared a sample piece of glass having 30 mm length, 30 mm width and 5 mm thickness. This sample piece was introduced into a temperature controlled furnace, with a bar-shaped indenter being kept pressed against the piece under a predetermined load. Through temperature control the indenter was caused to penetrate the sample piece, and from the observed penetrating rate, the temperature dependency of the glass viscosity was determined. From the correlation thus obtained, there was obtained a temperature where log $\eta$=7.65 ($\eta$ is the glass viscosity) and this temperature was determined as the softening point.

The warping point was measured in the following manner.

First, a rectangular glass bar sized as 3 mm vertically, 3 mm horizontally and 50 mm longitudinally was prepared. Then, this glass bar was set in a beam-bending type viscometer. Then, a load was applied to the central portion of the glass bar while opposed longitudinal ends of the sample were fixed, so that the warping point was determined based on the observed correlation between the bending rate and temperature of the glass.

The thermal expansion coefficient was obtained in the following manner.

First, there was prepared a cylindrical rod having 5 mm diameter and 15 mm height. The temperature and the amount of expansion of the glass were measured from 25° C. to the yielding point of the glass, and the coefficient of thermal expansion between 50° C. and 350° C. was calculated. The measurement of water-resistance was conducted in the following manner. The glass was crushed into glass particles; and those glass particles which passed a 590 μm sifter and were collected on a 420 μm sifter were cleaned with ethanol and then dried. From these, a specific weight portion was weighed and obtained. Then, these were left in 100 ml of pure water at 80° C. for 94 hours and reduction in the weight (%) was determined.

The devitrification in the vicinity of bricks was determined in the following manner.

Glass cullet 50 g and alumina brick fragments (95% $Al_2O_3$) of 10 cubic millimeters were together introduced into a platinum vessel of 50 mm x 50 mm and 10 mm in depth and melted at 1550° C. for 2 hours. Thereafter, this was kept at 1000° C. for 24 hours and then cooled to a room temperature. On this sample cooled to the room temperature, presence/absence of devitrificaton in the vicinity of bricks was observed. Those on which no devitrification at all was observed are denoted with "○", those on which slight devitrification was observed are denoted with "Δ", and those on which devitrification was apparently observed are denoted with "X", respectively.

Comparative Example

A comparison example glass composition identified as Sample 9 was made in the same manner as the embodiment examples described above and the respective properties thereof were measured in the same manners as those of the embodiment examples.

The results of the respective properties are shown in Table 1.

As may be understood from Table 1, each glass composition according to the present invention has a devitrifying temperature lower than the working temperature, a melting temperature of 1560° C. or lower, good devitrification property in the vicinity of bricks, superior water-resistance and low warping point. As a result, the thermal contraction during the tempering of the glass may be limited and the average thermal expansion at 50~350° C. may range at 75~95×10$^{-7}$/K. So that, while the composition maintains these properties to be suitable for continuous production of glass by the float process, this glass also has a high softening point so as to be able to provide a high performance as a fire door.

In contrast to the above, it may be understood that the glass composition of Sample 9 corresponding to soda-lime glass to be used in a window of a building has a low softening point, so that this cannot endure the testing for the A class fire door.

TABLE 1

| | 1 | 2 | 3 | 4 | 5 | 6 | 7 | 8 | 9 |
|---|---|---|---|---|---|---|---|---|---|
| $SiO_2$ | 62.0 | 61.0 | 65.0 | 64.9 | 62.4 | 60.2 | 60.0 | 57.0 | 72.1 |
| $Al_2O_3$ | 4.8 | 3.0 | 1.2 | 1.3 | 1.2 | 3.8 | 0.3 | 0.6 | 1.5 |
| MgO | 3.5 | 3.5 | 4.6 | 3.7 | 4.6 | 3.0 | 3.5 | 2.0 | 4.1 |
| CaO | 7.0 | 7.0 | 9.0 | 7.5 | 9.0 | 6.0 | 7.4 | 11.0 | 8.2 |
| SrO | 3.0 | 6.0 | 6.0 | 6.0 | 6.0 | 5.0 | 1.8 | 4.5 | 0.0 |
| BaO | 7.0 | 6.0 | 5.0 | 5.0 | 5.0 | 8.0 | 12.0 | 9.4 | 0.0 |
| ZnO | 0.5 | 0.0 | 0.0 | 0.0 | 0.0 | 0.0 | 0.0 | 0.0 | 0.0 |
| $Li_2O$ | 0.0 | 0.0 | 0.0 | 0.0 | 0.0 | 0.2 | 0.0 | 0.0 | 0.0 |
| $Na_2O$ | 3.6 | 3.0 | 2.8 | 1.7 | 2.8 | 2.0 | 1.8 | 3.8 | 13.0 |
| $K_2O$ | 7.5 | 9.0 | 6.2 | 9.5 | 6.8 | 8.0 | 12.0 | 9.8 | 1.0 |
| $ZrO_2$ | 0.5 | 1.5 | 0.0 | 0.3 | 2.0 | 2.8 | 0.5 | 1.1 | 0.0 |
| $SnO_2$ | 0.0 | 0.0 | 0.0 | 0.0 | 0.0 | 0.2 | 0.0 | 0.0 | 0.0 |
| $TiO_2$ | 0.3 | 0.0 | 0.0 | 0.0 | 0.0 | 0.6 | 0.5 | 0.5 | 0.0 |
| $Fe_2O_3$ | 0.1 | 0.0 | 0.1 | 0.0 | 0.0 | 0.1 | 0.0 | 0.1 | 0.1 |
| $SO_3$ | 0.2 | 0.0 | 0.1 | 0.1 | 0.2 | 0.1 | 0.2 | 0.2 | 0.0 |
| Total | 100.0 | 100.0 | 100.0 | 100.0 | 100.0 | 100.0 | 100.0 | 100.0 | 100.0 |

TABLE 1-continued

|  | 1 | 2 | 3 | 4 | 5 | 6 | 7 | 8 | 9 |
|---|---|---|---|---|---|---|---|---|---|
| $R_2O$ ($Na_2O + K_2O$) | 11.1 | 12.0 | 9.0 | 11.2 | 9.6 | 10.0 | 13.8 | 13.6 | 14.0 |
| MgO + CaO | 10.5 | 10.5 | 13.6 | 11.2 | 13.6 | 9.0 | 10.9 | 13.0 | 12.3 |
| SrO + BaO | 10.0 | 12.0 | 11.0 | 11.0 | 11.0 | 13.0 | 13.8 | 13.9 | 0.0 |
| RO (MgO + CaO + SrO + BaO) | 20.5 | 22.5 | 24.6 | 22.2 | 24.6 | 22.0 | 24.7 | 26.9 | 12.3 |
| melting temperature (° C.) | 1542 | 1528 | 1520 | 1535 | 1497 | 1525 | 1523 | 1511 | 1462 |
| working temperature (° C.) | 1139 | 1119 | 1125 | 1127 | 1096 | 1120 | 1130 | 1098 | 1039 |
| devitrification temperature (° C.) | 1115 | 1105 | 1100 | 1080 | 1092 | 1090 | 1119 | 1082 | 991 |
| softening point (° C.) | 824 | 809 | 820 | 820 | 812 | 808 | 830 | 788 | 738 |
| distortion point (° C.) | 571 | 563 | 575 | 578 | 596 | 558 | 590 | 545 | 509 |
| coefficient of thermal expansion ×$10^{-7}$ (/K) | 86 | 89 | 79 | 84 | 81 | 85 | 86 | 92 | 86 |
| water resistance (%) | 0.3 | 0.3 | 0.4 | 0.5 | 0.5 | 0.3 | 1.1 | 0.8 | 0.4 |
| devitrification adjacent brick | Δ | ○ | ○ | ○ | ○ | ○ | ○ | Δ | ○ |

What is claimed is:

1. A fireproof sheet glass comprising:
   from 56 to 68 wt. % $SiO_2$;
   from 0.2 to 5 wt. % $Al_2O_3$;
   from 0.2 to 3 wt. % $ZrO_2$;
   from 0 to 0.5 wt. % $Li_2O$;
   from 0.2 to 4 wt. % NaO;
   from 6 to 11 wt. % $K_2O$;
   from 1 to 7 wt. % MgO;
   from 6 to 12 wt. % CaO;
   from 0 to 12 wt. % SrO;
   from 0 to 13 wt. % BaO;
   from 0 to 2 wt. % ZnO;
   wherein the combined weight of $Na_2O$ and $K_2O$ is from 8 to 14 wt. %; the combined weight of MgO and CaO is from 8 to 15 wt. %; the combined weight of SrO and BaO is from 8 to 14 wt. %; the combined weight of MgO, CaO, SrO and BaO is from 20 to 27 wt. %; and the combined weight of $SO_3$ and $Sb_2O_3$ is from 0 to 1 wt. %; and wherein the composition has an average thermal expansion ratio at between and 50 and 350° C. of from 75 to 95×$10^{-7}$/K, a warping point of at least 540° C.; a $10^2$ poise temperature of not greater than 1560° C.; and a softening point of at least 780° C.

2. A fireproof sheet glass comprising:
   from 56 to 68 wt. % $SiO_2$;
   from 0.2 to 4 wt. % $Al_2O_3$;
   from 0.2 to 2.5 wt. % $ZrO_2$;
   from 0 to 0.5 wt. % $Li_2O$;
   from 0.2 to 3.5 wt. % NaO;
   from 7 to 11 wt. % $K_2O$;
   from 2 to 6 wt. % MgO;
   from 6 to 10 wt. % CaO;
   from 2 to 10 wt. % SrO;
   from 2 to 10 wt.% BaO;
   from 0 to 2 wt. % ZnO;
   wherein the combined weight of NaO and $K_2O$ is from 8 to 14 wt. %; the combined weight of MgO and CaO is from 8 to 15 wt. %; the combined weight of SrO and BaO is from 8 to 14 wt. %; the combined weight of MgO, CaO SrO and BaO is from 20 to 27 wt. %; and the combined weight of $SO_3$ and $Sb_2O_3$ is from 0 to 1 wt. %; and wherein the composition has an average thermal expansion ratio at between and 50 and 350° C. of from 75 to 95×$10^{-7}$/K, a warping point of at least 550° C.; a $10^2$ poise temperature of not greater than 1550° C.; and a softeninеg point of at least 780° C.

3. A fireproof sheet glass comprising:
   from 56 to 66 wt. % $SiO_2$;
   from 0.5 to 4 wt. % $Al_2O_3$;
   from 0.2 to 2.5 wt. % $ZrO_2$;
   from 0 to 0.1 wt. % $Li_2O$;
   from 0.5 to 3 wt. % NaO;
   from 8 to 11 wt. % $K_2O$;
   from 2 to 6 wt. % MgO;
   from 6 to 10 wt. % CaO;
   from 2 to 10 wt. % SrO;
   from 2 to 10 wt. % BaO;
   from 0 to 1 wt. % ZnO;
   wherein the combined weight of NaO and $K_2O$ is from 9 to 13 wt. %; the combined weight of MgO and CaO is from 9 to 13 wt. %; the combined weight of SrO and BaO is from 10 to 14 wt. %; the combined weight of MgO, CaO, SrO and BaO is from 21 to 26 wt. %; and the combined weight of $SO_3$ and $Sb_{2,3}$ is from 0 to 1 wt. %; and wherein the composition has an average thermal expansion ratio at between and 50 and 350 ° C. of from 80 to 90×$10^{-7}$/K, a warping point of at least 550° C.; a $10^2$ poise temperature of not greater than 1550° C.; and a softening point of at least 780° C.

4. The fireproof sheet glass of claim 1, wherein the sheet glass is a wire glass.

5. The fireproof sheet glass of claim 2, wherein the sheet glass is a wire glass.

6. The fireproof sheet glass of claim 3, wherein the sheet glass is a wire glass.

7. The fireproof sheet glass of claim 1, wherein the sheet glass is heat-tempered.

8. The fireproof sheet glass of claim 2, wherein the sheet glass is heat-tempered.

9. The fireproof sheet glass of claim 3, wherein the sheet glass is heat-tempered.

10. The fireproof sheet glass of claim 1, wherein the sheet glass has a $10^4$ poise temperature of not greater than 1140° C.

11. The fireproof sheet glass of claim 2, wherein the sheet glass has a $10^4$ poise temperature of not greater than 1140° C.

12. The fireproof sheet glass of claim 3, wherein the sheet glass has a $10^4$ poise temperature of not greater than 1140° C.

13. The fireproof sheet glass of claim 4, wherein the sheet glass has a $10^4$ poise temperature of not greater than 1140° C.

14. The fireproof sheet glass of claim 5, wherein the sheet glass has a $10^4$ poise temperature of not greater than 1140° C.

15. The fireproof sheet glass of claim 6, wherein the sheet glass has a $10^4$ poise temperature of not greater than 1140° C.

16. The fireproof sheet glass of claim 7, wherein the sheet glass has a $10^4$ poise temperature of not greater than 1140° C.

17. The fireproof sheet glass of claim 8, wherein the sheet glass has a $10^4$ poise temperature of not greater than 1140° C.

18. The fireproof sheet glass of claim 9, wherein the sheet glass has a $10^4$ poise temperature of not greater than 1140° C.

* * * * *

UNITED STATES PATENT AND TRADEMARK OFFICE
CERTIFICATE OF CORRECTION

PATENT NO. : 6,054,401
DATED : Apr. 25, 2000
INVENTOR(S) : Sugiura et al.

It is certified that error appears in the above-indentified patent and that said Letters Patent is hereby corrected as shown below:

In column 3, line 28, change "Zro$_2$" to -- ZrO$_2$ --.
In column 6, line 37, change "as" to -- axis --.
In column 6, line 38, change "denotea" to -- denotes --.
In column 9, line 24, change "NaO" to -- Na$_2$O --.
In column 9, line 50, change "NaO" to -- Na$_2$O --.
In column 9, line 58, change "NaO" to -- Na$_2$O --.
In column 20, line 13, change "Sb$_{2'3}$" to -- Sb$_2$O$_3$ --.

Signed and Sealed this

Twentieth Day of March, 2001

*Attest:*

NICHOLAS P. GODICI

*Attesting Officer*    *Acting Director of the United States Patent and Trademark Office*